UNITED STATES PATENT OFFICE.

PETER STIENS, OF LONDON, ENGLAND.

INCANDESCENT MANTLE.

SPECIFICATION forming part of Letters Patent No. 569,892, dated October 20, 1896.

Application filed March 9, 1896. Serial No. 582,474. (No model.)

*To all whom it may concern:*

Be it known that I, PETER STIENS, engineer, a subject of the Emperor of Germany, residing at 62 Leyton Park Road, Leyton, London, in the county of Essex, England, have invented certain new and useful Improvements in Incandescent Mantles, of which the following is a specification.

According to this invention magnesium chlorid which has been heated to a high temperature and then cooled is ground and preferably mixed with a small quantity of powdered burnt chalk and gum-tragacanth or gelatin. The mixture is made into a paste with water and passed into a mold to the desired form. When dry the mantle is sprayed over with a solution of unburnt magnesium chlorid and subjected to a high temperature in a furnace. The proportions preferred are about two to three per cent. of chalk and five per cent. of gum or gelatin.

The mantle is preferably shaped somewhat like a thimble and small holes through it, as close together as possible, are formed during the process of molding.

Both the preliminary and final heating should last for several hours.

Mantles can also be made by impregnating threads or woven material with a solution of magnesium chlorid which has been exposed to a high temperature and either mixed or not with chalk, then drying them, and afterward spraying with a solution of unburnt magnesium chlorid, and finally again exposing them to a high temperature.

The magnesium chlorid is preferably prepared by placing it in a crucible in a gas or other furnace, where it is heated until it first melts and then turns into a white powder.

The gum-tragacanth and gelatin are merely binding materials to hold the materials together while the mantle is being made. They burn away with the fabric when it is used. The chalk and the magnesium chlorid remain and constitute the incandescing material. The chalk, while not essential, nevertheless materially improves the result.

Having now particularly described and ascertained the nature of my said invention and in what manner the same is to be performed, I declare that what I claim is—

1. An incandescent mantle comprising in its construction magnesium chlorid which has been exposed to a high temperature.

2. An incandescent mantle formed of magnesium chlorid, which has been exposed to a high temperature, burnt chalk and adhesive material.

3. The process of manufacturing mantles consisting in exposing magnesium chlorid to a high temperature, grinding it with burnt chalk and adhesive material, molding it under pressure, covering it with a solution of magnesium chlorid and again exposing it to heat.

4. The process of manufacturing mantles consisting in impregnating threads or woven material with magnesium chlorid which has been exposed to a high temperature drying them and covering them with a solution of magnesium chlorid and again exposing them to heat.

PETER STIENS.

Witnesses:
JOSEPH LAKE,
ROBERT B. RANSFORD.